United States Patent
Xiao

(10) Patent No.: US 12,294,052 B2
(45) Date of Patent: May 6, 2025

(54) METHOD FOR REDUCED INTERFACIAL IMPEDANCE IN A SOLID-STATE BATTERY CELL

(71) Applicant: GM GLOBAL TECHNOLOGY OPERATIONS LLC, Detroit, MI (US)

(72) Inventor: Xingcheng Xiao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 253 days.

(21) Appl. No.: 18/158,719

(22) Filed: Jan. 24, 2023

(65) Prior Publication Data
US 2024/0250289 A1 Jul. 25, 2024

(51) Int. Cl.
*H01M 10/0562* (2010.01)
*H01M 10/0585* (2010.01)

(52) U.S. Cl.
CPC ... *H01M 10/0562* (2013.01); *H01M 10/0585* (2013.01); *H01M 2220/20* (2013.01); *H01M 2300/0077* (2013.01)

(58) Field of Classification Search
CPC ................................................. H01M 10/0562
See application file for complete search history.

(56) References Cited

U.S. PATENT DOCUMENTS

| | | | | |
|---|---|---|---|---|
| 2019/0013546 A1* | 1/2019 | Visco | ................ | H01M 10/0525 |
| 2022/0271334 A1* | 8/2022 | Reddy Arava | ...... | H01M 10/052 |
| 2022/0336817 A1* | 10/2022 | Roev | ..................... | C01B 32/174 |
| 2022/0336846 A1* | 10/2022 | Xiao | ................ | H01M 10/0562 |
| 2023/0059842 A1* | 2/2023 | Komatsu | ............ | H01M 4/0404 |

OTHER PUBLICATIONS

Sufyan, Muhammad: "Plasma Etching: A Comprehensive Guide to the Process and Applications," Dec. 14, 2023 (https://www.wevolver.com/article/plasma-etching-a-comprehensive-guide-to-the-process-and-applications#plasma-etching-mechanisms, accessed Nov. 16, 2024) (Year: 2023).*
Fu, Kun, et al. "Transient behavior of the metal interface in lithium metal—garnet batteries." Angewandte Chemie International Edition 56.47 (2017): 14942-14947. (Year: 2017).*

* cited by examiner

*Primary Examiner* — Allison Bourke
*Assistant Examiner* — Kayla Elaine Clary
(74) *Attorney, Agent, or Firm* — Quinn IP Law

(57) ABSTRACT

A method to create a battery cell is provided. The method includes, within a vacuum or an inert atmosphere, utilizing an etching process to remove a passivation layer from a primary surface of a solid electrolyte. The method further includes applying a surface coating to the primary surface. The method further includes, within the battery cell, disposing the solid electrolyte including the surface coating between an anode and a cathode.

20 Claims, 3 Drawing Sheets

METHOD FOR REDUCED INTERFACIAL IMPEDANCE IN A SOLID-STATE BATTERY CELL

GOVERNMENT CONTRACT

This application was made with government support under contract no. DE-EE0008863 awarded by the Department of Energy. The government has certain rights in the invention.

INTRODUCTION

The present disclosure relates to a method for reduced interfacial impedance in a solid-state battery cell.

Lithium-ion batteries and lithium metal batteries are desirable candidates for powering electronic devices in the consumer, automotive, and aerospace industries due to their relatively high energy density, high power density, lack of memory effect, and long cycle life, as compared to other rechargeable battery technologies, including lead-acid batteries, nickel-cadmium and nickel-metal-hydride batteries.

A solid-state battery cell includes a solid electrolyte. The solid electrolyte may include a first planar primary surface which abuts and contacts a planar primary surface of an anode electrode. The solid electrolyte may include a second planar primary surface which abuts and contacts a planar primary surface of a cathode electrode.

SUMMARY

A method to create a battery cell is provided. The method includes, within a vacuum or an inert atmosphere, utilizing an etching process to remove a passivation layer from a primary surface of a solid electrolyte. The method further includes subsequently applying a surface coating to the primary surface. The method further includes, within the battery cell, disposing the solid electrolyte including the surface coating between an anode and a cathode.

In some embodiments, utilizing the etching process includes utilizing an ion-beam etching process, a laser etching process, or a plasma etching process.

In some embodiments, applying the surface coating includes applying an ionic conductive coating to the primary surface.

In some embodiments, applying the ionic conductive coating to the primary surface includes applying lithium aluminate ($LiAlO_2$) or lithium niobate ($LiNbO_2$) to the primary surface.

In some embodiments, applying the ionic conductive coating to the primary surface includes applying a layer with a thickness of least 50 nanometers to fully cover the primary surface.

In some embodiments, applying the surface coating includes applying a metallic interlayer to the primary surface.

In some embodiments, applying the metallic interlayer to the primary surface includes depositing metallic particles upon the primary surface and heat treating the metallic particles.

In some embodiments, applying the metallic interlayer to the primary surface includes applying aluminum, tantalum, germanium, iron, or niobium to the primary surface.

In some embodiments, applying the metallic interlayer to the primary surface includes applying a layer with a thickness of least 10 nanometers.

According to one alternative embodiment, a method to create a battery cell is provided. The method includes, within a vacuum or an inert atmosphere, utilizing an etching process to remove a first passivation layer from a first primary surface of a solid electrolyte and a second passivation layer from a second primary surface of the solid electrolyte. The method further includes applying a first surface coating to the first primary surface and applying a second surface coating to the second primary surface. The method further includes, within the battery cell, disposing the solid electrolyte including the first surface coating and the second surface coating between an anode and a cathode.

In some embodiments, utilizing the etching process includes utilizing an ion-beam etching process, a laser etching process, or a plasma etching process.

In some embodiments, applying the first surface coating includes applying a first ionic conductive coating to the first primary surface. Applying the second surface coating includes applying a second ionic conductive coating to the first primary surface.

In some embodiments, applying the first ionic conductive coating to the primary surface includes applying lithium aluminate ($LiAlO_2$) or lithium niobate ($LiNbO_2$) to the first primary surface.

In some embodiments, applying the first ionic conductive coating to the first primary surface includes applying a layer with a thickness of least 50 nanometers.

In some embodiments, applying the first surface coating includes applying a first metallic interlayer to the first primary surface. Applying the second surface coating includes applying a second metallic interlayer to the second primary surface.

In some embodiments, applying the first metallic interlayer to the first primary surface includes depositing metallic particles upon the first primary surface and heat treating the metallic particles.

In some embodiments, applying the first metallic interlayer to the first primary surface includes applying aluminum, tantalum, germanium, iron, or niobium to the first primary surface.

In some embodiments, applying the first metallic interlayer to the primary surface includes applying a layer with a thickness of least 10 nanometers.

According to one alternative embodiment, a solid-state battery cell is provided. The solid-state battery cell includes an anode, a cathode, and a planar solid electrolyte. The planar solid electrolyte includes a first passivation layer-free primary surface and a second passivation layer-free primary surface. The planar solid electrolyte further includes a first surface coating applied to the first passivation layer-free primary surface and a second surface coating applied to the second passivation layer-free primary surface. The first coating and the second coating are each a metallic interlayer or a superionic interlayer.

In some embodiments, the first coating and the second coating are each the superionic interlayer. The superionic interlayer includes lithium aluminate ($LiAlO_2$) or lithium niobate ($LiNbO_2$).

The above features and advantages and other features and advantages of the present disclosure are readily apparent from the following detailed description of the best modes for carrying out the disclosure when taken in connection with the accompanying drawings.

DETAILED DESCRIPTION

Figure 1:
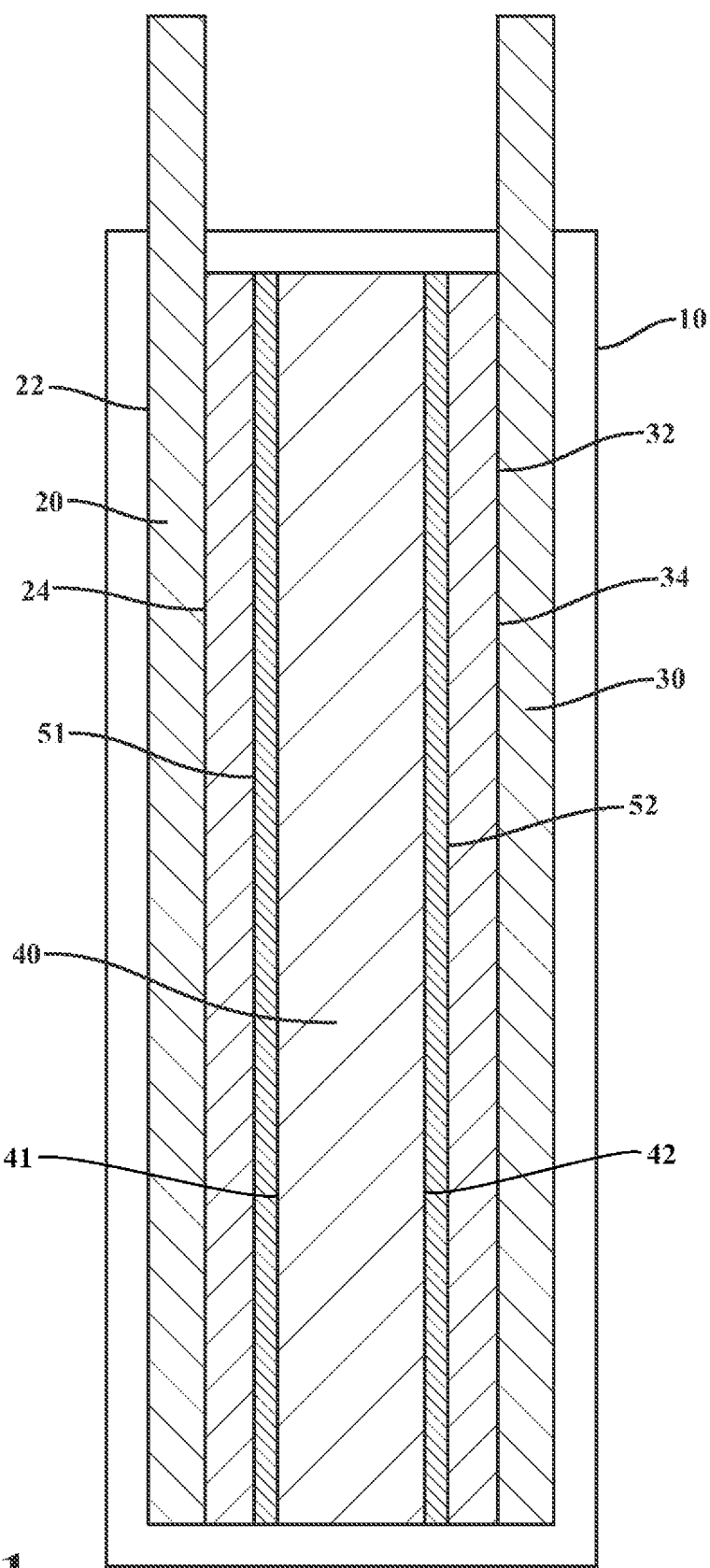
FIG. 1 schematically illustrates in cross-section an exemplary battery cell including a solid electrolyte treated according to an etching and subsequent surface coating deposition method, in accordance with the present disclosure.

A battery system may include a plurality of solid-state battery cells. A solid-state battery cell may include an anode electrode, a cathode electrode, and a solid electrolyte.

A solid-state battery including a solid electrolyte provides excellent operational benefits, including excellent energy density, resistance to dendrite growth, excellent reliability, and excellent high temperature stability as compared to a liquid electrolyte. One drawback to use of some solid electrolytes is that some solid electrolyte materials react with the moisture and carbon dioxides and create a film upon surfaces of the solid electrolyte when exposed to air. For example, when the solid electrolyte is constructed with lithium lanthanum zirconium oxide (LLZO), a passivation layer such as a layer of lithium carbonate ($Li_2CO_3$) may tend to form upon the surface of the solid electrolyte. LLZO may be described as a lithium stuffed garnet material. Such a passivation layer may cause increased interfacial impedance or resistance between the solid electrolyte and an adjoining component, such as an anode electrode or a cathode electrode. Such a passivation layer may be ground or sanded off, but such procedures may damage a surface of the underlying solid electrolyte. Further, subsequent exposure to air may cause reoccurrence of the passivation layer and degraded battery cell operation.

A method to create a solid-state battery cell with excellent interfacial impedance is provided. The solid electrolyte may be planar with a first primary surface and a second primary surface. The method includes removing a passivation layer from the first primary surface and/or the second primary surface. Removal of the passivation layer may be accomplished by using an exemplary ion-beam etching process. The removal of the passivation layer may be performed in a non-oxygenated environment, for example, including an inert atmosphere (in an argon, helium, or nitrogen environment) or within a vacuum ($<10^{-2}$ torr) to prevent contamination of the etched surface.

The ion etching process may include ion energy in a range from 5 electron-volts (eV) to 1,200 eV. The beam current may include a range from 50 milliamps to 1,000 milliamps. The etching time may range from one minute to one hour.

In an alternative process, a laser or plasma process may be employed to remove the passivation layer. Such processes may be operated in a vacuum or within an inert atmosphere.

Once the passivation layer is removed from one or both primary surfaces of the solid electrolyte, a surface coating may be applied to the treated primary surfaces to protect the solid electrolyte from forming a new passivation layer and to facilitate charge transfer by maximizing the contact between the solid electrolyte and the electrodes. In some embodiments, the surface coating may include an ionic conductive coating, including lithium aluminate ($LiAlO_2$), lithium niobate $LiNbO_2$, or similar coatings. Such ionic conductive coatings are air and moisture stable. Such ionic conductive coatings may be applied in a thickness greater than 50 nanometers.

In other embodiments, the surface coating may include a metallic interlayer, including aluminum, tantalum, germanium, iron, niobium, or similar metals. Such metallic interlayers may be incorporated into the LLZO lattice to suppress phase transformation and stabilize a cubic phase. A metallic interlayer may include additional heat treatment to complete the application process.

The disclosed etching process and subsequent deposition of a surface coating upon the solid electrolyte provides relatively low interfacial impedance between the solid electrolyte and neighboring electrodes. Additionally, the disclosed coated solid electrolyte provides excellent lithium wettability for maintaining intimate contact between the electrodes and the solid electrolyte.

As a result of the disclosed etching process and subsequent deposition of a surface coating upon the solid electrolyte, formation of a passivation layer is prevented. The treated solid electrolyte may be handled in less restrictive environments than an untreated solid electrolyte.

Referring now to the drawings, wherein like reference numbers refer to like features throughout the several views, FIG. 1 schematically illustrates in cross-section an exemplary battery cell 10 including a solid electrolyte 40 treated according to the disclosed etching and subsequent surface coating deposition method disclosed herein. The battery cell 10 is illustrated including an anode 20, a cathode 30, and the solid electrolyte 40. The anode 20 includes a current collector 22 and an anode electrode 24. The anode electrode 24 may include an anode active material including lithium metal, silicon, tin, or their alloys. The anode electrode may further include a conductive additive and a binder. The cathode 30 includes a current collector 32 and a cathode electrode 34. The cathode electrode may include a cathode active material including lithium nickel manganese cobalt oxide ($LiNiMnCoO_2$ or NMC), lithium manganese oxide (LMO), sulfur (S), lithium iron manganese phosphate (LFMP), lithium iron phosphate (LFP), or a combination thereof.

The solid electrolyte 40 may be constructed with LLZO. The solid electrolyte 40 may be planar and may include a first primary surface 41 and a second primary surface 42. The first primary surface 41 includes a surface coating 51. The second primary surface 42 includes a surface coating 52. Prior to the application of the surface coatings 51, 52, each of the first primary surface 41 and the second primary surface 42 are etched with an ion-beam treatment, a laser treatment, or a plasma treatment in order to remove a passivation layer that may have been present upon the first primary surface 41 and the second primary surface 42.

In some embodiments, the surface coatings 51, 52 may include an ionic conductive coating, including lithium aluminate ($LiAlO_2$), lithium niobate $LiNbO_2$, or similar coatings. Such ionic conductive coatings may be applied in a thickness greater than 50 nanometers. The surface coatings 51, 52 including the ionic conductive coating may be described as including a superionic interlayer.

In other embodiments, the surface coatings 51, 52 may include a metallic interlayer, including aluminum, tantalum, germanium, iron, niobium, or similar metals. Such metallic interlayers may be incorporated into the LLZO lattice to suppress phase transformation and stabilize a cubic phase.

FIG. 1 illustrates components to the battery cell 10 with similar thicknesses for purposes of illustration. Some of the illustrated components, such as the surface coatings 51, 52 may be microscopic and not visible to a viewer.

The embodiment of FIG. 1 may be described as a solid-state battery cell. The solid-state battery cell includes an anode, a cathode, and a planar solid electrolyte. The planar solid electrolyte includes a first passivation layer-free primary surface and a second passivation layer-free primary surface. The planar solid electrolyte further includes a first surface coating applied to the first passivation layer-free primary surface and a second surface coating applied to the second passivation layer-free primary surface. The first coating and the second coating are each a metallic interlayer or a superionic interlayer.

Figure 2:
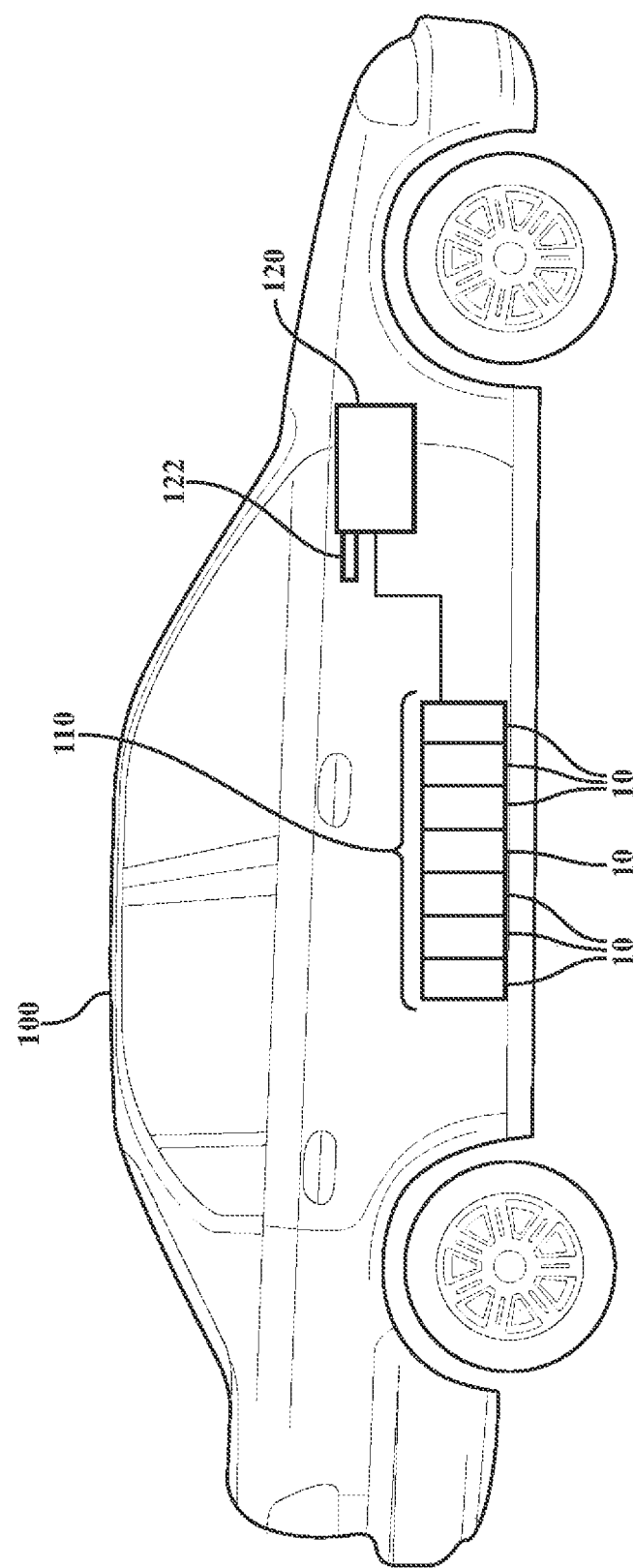
FIG. 2 schematically illustrates an exemplary device including a battery pack that includes a plurality of battery cells, in accordance with the present disclosure.

The battery cell 10 may be utilized in a wide range of applications and powertrains. FIG. 2 schematically illustrates an exemplary device 100, e.g., a battery electric vehicle (BEV), including a battery pack 110 that includes a plurality of battery cells 10. The plurality of battery cells 10 may be connected in various combinations, for example, with a portion being connected in parallel and a portion being connected in series, to achieve goals of supplying electrical energy at a desired voltage. The battery pack 110 is illustrated as electrically connected to a motor generator unit 120 useful to provide motive force to the device 100. The motor generator unit 120 may include an output component 122, for example, an output shaft, which is provided mechanical energy useful to provide the motive force to the device 100. A number of variations to device 100 are envisioned, for example, including a powertrain, a boat, or an airplane, and the disclosure is not intended to be limited to the examples provided.

Figure 3:
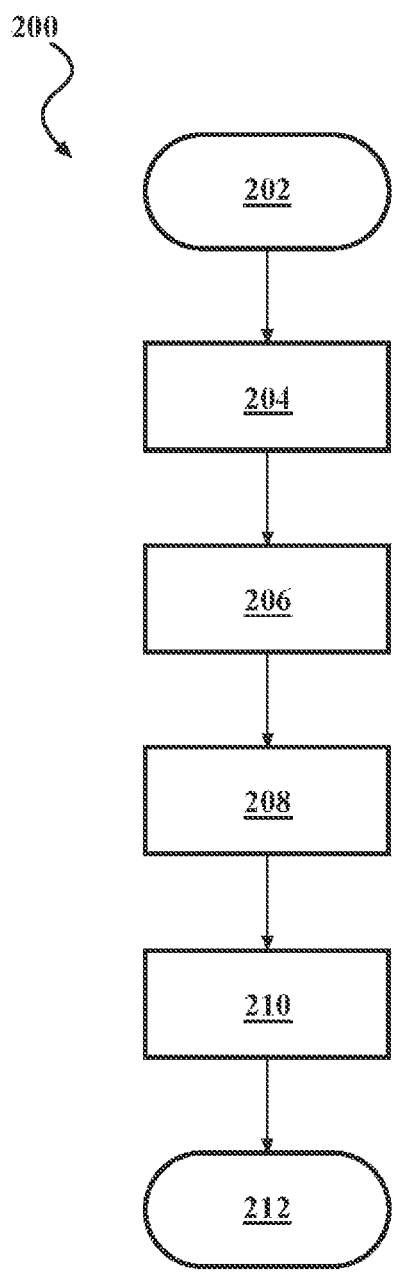
FIG. 3 is a flowchart illustrating a method for manufacturing the battery cell of FIG. 1 including the solid electrolyte including surface coatings, wherein the surface coatings include an ionic conductive coating, in accordance with the present disclosure.

FIG. 3 is a flowchart illustrating a method 200 for manufacturing the battery cell 10 of FIG. 1 including the solid electrolyte 40 including surface coatings 51, 52, wherein the surface coatings 51, 52, include an ionic conductive coating. While the method 200 is described in relation to the battery cell 10 of FIG. 1, the method 200 may similarly be applied in relation to other similar battery cell configurations. The method 200 starts at step 202. At step 204, a slurry is prepared including an ionic conductive material and a solvent. At step 206, a primary surface of a planar solid electrolyte 40 is etched according to the disclosed ion-beam process, a laser process, or a plasma process. At step 208, the slurry is applied to the primary surface 41 of the solid electrolyte 40. The steps 206 and 208 may take place in a vacuum or in an inert atmosphere. At step 210, after the slurry has been permitted to dry, the solid electrolyte 40 including the surface coating 51 is disposed within a battery cell 10 between an anode 20 and a cathode 30. The steps 204 through 210 may be repeated upon a second primary surface 42 of the solid electrolyte 40. After step 210, the battery cell may be operational. At step 212, the method 200 ends. The method 200 is an exemplary method or process to manufacture the disclosed battery cell 10. A number of additional and/or alternative method steps are envisioned, and the disclosure is not intended to be limited to the examples provided herein.

Figure 4:
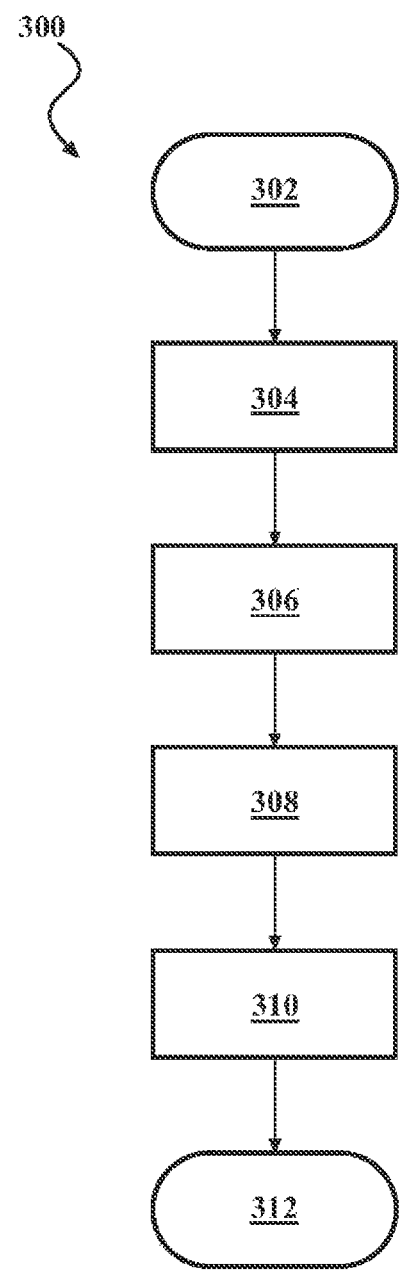
FIG. 4 is a flowchart illustrating a method for manufacturing the battery cell of FIG. 1 including the solid electrolyte including surface coatings, wherein the surface coatings include a metallic interlayer, in accordance with the present disclosure.

FIG. 4 is a flowchart illustrating a method 300 for manufacturing the battery cell 10 of FIG. 1 including the solid electrolyte 40 including surface coatings 51, 52, wherein the surface coatings 51, 52, include a metallic interlayer. While the method 300 is described in relation to the battery cell 10 of FIG. 1, the method 300 may similarly be applied in relation to other similar battery cell configurations. The method 300 starts at step 302. At step 304, a primary surface of a planar solid electrolyte 40 is etched according to the disclosed ion-beam process, a laser process, or a plasma process. At step 306, metallic particles, such as aluminum particles, are deposited upon a primary surface 41. At step 308, the metallic particles are heat treated. The heat treatment occurs within a temperature range less than a melting point of the metallic particles. The steps 304 through 308 may take place in a vacuum or in an inert atmosphere. At step 310, the solid electrolyte 40 including the surface coating 51 is disposed within a battery cell 10 between an anode 20 and a cathode 30. The steps 304 through 310 may be repeated upon a second primary surface 42 of the solid electrolyte 40. After step 310, the battery cell may be operational. At step 312, the method 300 ends. The method 300 is an exemplary method or process to manufacture the disclosed battery cell 10. A number of additional and/or alternative method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A method to create a battery cell, comprising:
within a vacuum or an inert atmosphere, utilizing an etching process to remove a passivation layer from a primary surface of a solid electrolyte, wherein the solid electrolyte is constructed with lithium lanthanum zirconium oxide and the passivation layer includes lithium carbonate;
subsequently applying a surface coating to the primary surface with a slurry including an ionic conductive material and a solvent while the solid electrolyte is within the vacuum or the inert atmosphere; and
within the battery cell, disposing the solid electrolyte including the surface coating between an anode and a cathode.

2. The method of claim 1, wherein utilizing the etching process includes utilizing an ion-beam etching process, a laser etching process, or a plasma etching process.

3. The method of claim 1, wherein applying the surface coating includes applying an ionic conductive coating to the primary surface.

4. The method of claim 3, wherein applying the ionic conductive coating to the primary surface includes applying lithium aluminate ($LiAlO_2$) or lithium niobate ($LiNbO_2$) to the primary surface.

5. The method of claim 3, wherein applying the ionic conductive coating to the primary surface includes applying a layer with a thickness of least 50 nanometers to fully cover the primary surface.

6. The method of claim 1, wherein applying the surface coating includes applying a metallic interlayer to the primary surface.

7. The method of claim 6, wherein applying the metallic interlayer to the primary surface includes:
depositing metallic particles upon the primary surface; and
heat treating the metallic particles.

8. The method of claim 6, wherein applying the metallic interlayer to the primary surface includes applying aluminum, tantalum, germanium, iron, or niobium to the primary surface.

9. The method of claim 6, wherein applying the metallic interlayer to the primary surface includes applying a layer with a thickness of at least 10 nanometers.

10. A method to create a battery cell, comprising:
within a vacuum or an inert atmosphere, utilizing an etching process to remove a first passivation layer from a first primary surface of a solid electrolyte and a second passivation layer from a second primary surface of the solid electrolyte, wherein the solid electrolyte is constructed with lithium lanthanum zirconium oxide;
applying a first surface coating to the first primary surface with a first slurry including an ionic conductive material and a solvent while the solid electrolyte is within the vacuum or the inert atmosphere;
applying a second surface coating to the second primary surface with a second slurry including an ionic conductive material and a solvent while the solid electrolyte is within the vacuum of the atmosphere; and
within the battery cell, disposing the solid electrolyte including the first surface coating and the second surface coating between an anode and a cathode.

11. The method of claim 10, wherein utilizing the etching process includes utilizing an ion-beam etching process, a laser etching process, or a plasma etching process.

12. The method of claim 10, wherein applying the first surface coating includes applying a first ionic conductive coating to the first primary surface; and
wherein applying the second surface coating includes applying a second ionic conductive coating to the second primary surface.

13. The method of claim 12, wherein applying the first ionic conductive coating to the first primary surface includes applying lithium aluminate ($LiAlO_2$) or lithium niobate ($LiNbO_2$) to the first primary surface.

14. The method of claim 12, wherein applying the first ionic conductive coating to the first primary surface includes applying a layer with a thickness of least 50 nanometers.

15. The method of claim 12, wherein applying the second ionic conductive coating to the second primary surface includes applying a layer with a thickness of least 50 nanometers.

16. The method of claim 10, wherein applying the first surface coating includes applying a first metallic interlayer to the first primary surface; and
wherein applying the second surface coating includes applying a second metallic interlayer to the second primary surface.

17. The method of claim 16, wherein applying the first metallic interlayer to the first primary surface includes:
depositing metallic particles upon the first primary surface; and
heat treating the metallic particles.

18. The method of claim 16, wherein applying the first metallic interlayer to the first primary surface includes applying aluminum, tantalum, germanium, iron, or niobium to the first primary surface.

19. The method of claim 16, wherein applying the first metallic interlayer to the first primary surface includes applying a layer with a thickness of at least 10 nanometers.

20. The method of claim 19, wherein applying the second metallic interlayer to the second primary surface includes applying a layer with a thickness of at least 10 nanometers.

* * * * *